US012462075B2

(12) United States Patent
Yang et al.

(10) Patent No.: US 12,462,075 B2
(45) Date of Patent: Nov. 4, 2025

(54) RESOURCE PREDICTION SYSTEM FOR EXECUTING MACHINE LEARNING MODELS

(71) Applicant: Accenture Global Solutions Limited, Dublin (IE)

(72) Inventors: Yao Yang, Sunnyvale, CA (US); Andrew Hoonsik Nam, San Francisco, CA (US); Mohamad Mehdi Nasr-Azadani, San Francisco, CA (US); Teresa Sheausan Tung, Tustin, CA (US); Ophelia Min Zhu, San Lorenzo, CA (US); Thien Quang Nguyen, San Jose, CA (US); Zaid Tashman, San Francisco, CA (US)

(73) Assignee: Accenture Global Solutions Limited, Dublin (IE)

(*) Notice: Subject to any disclaimer, the term of this patent is extended or adjusted under 35 U.S.C. 154(b) by 797 days.

(21) Appl. No.: 17/182,538

(22) Filed: Feb. 23, 2021

(65) Prior Publication Data
US 2022/0269835 A1    Aug. 25, 2022

(51) Int. Cl.
*G06F 30/20*    (2020.01)
*G06F 11/34*    (2006.01)
*G06N 20/00*    (2019.01)

(52) U.S. Cl.
CPC .......... *G06F 30/20* (2020.01); *G06F 11/3461* (2013.01); *G06N 20/00* (2019.01)

(58) Field of Classification Search
CPC ................. G06F 30/20; G06F 11/3461; G06F 2201/865; G06F 11/302; G06F 11/323; G06F 11/3409; G06F 30/25; G06F 30/27; G06F 30/28; G06F 2111/00–2119/22; G06N 20/00
See application file for complete search history.

(56) References Cited

U.S. PATENT DOCUMENTS

| | | | |
|---|---|---|---|
| 2019/0034785 A1* | 1/2019 | Murray | G06N 3/084 |
| 2020/0279187 A1* | 9/2020 | Huang | G06F 11/3428 |
| 2021/0081763 A1* | 3/2021 | Abdelfattah | G06N 20/00 |

* cited by examiner

*Primary Examiner* — Emerson C Puente
*Assistant Examiner* — Alfred H B Wechselberger
(74) *Attorney, Agent, or Firm* — Polsinelli, PC

(57) ABSTRACT

A resource prediction system for executing machine learning models and method are provided. The system includes non-transitory memory storing instructions and a processor configured to execute the instructions to obtain input data including a targeted objective and the constraints, select a deployable machine learning model having an evaluation score that meets a predetermined criterion from among candidate machine learning models, virtually execute the deployable machine learning model on each of candidate hardware platforms according to the constraints, generate an assessment report of the virtual performance metrics set of the deployable machine learning model executed on each of the candidate hardware platforms, and select the suggested hardware platform meeting the predetermined criterion from among the candidate hardware platforms.

16 Claims, 10 Drawing Sheets

RESOURCE PREDICTION SYSTEM FOR EXECUTING MACHINE LEARNING MODELS

TECHNICAL FIELD

This disclosure relates to machine learning and artificial intelligence (AI), and is particularly directed to resource and hardware constraints prediction for machine learning system.

BACKGROUND

Over the past decade, machine learning and AI have evolved at a very noticeable pace. In order for an organization to take advantage of machine learning and AI to derive practical business value, it may be desirable for the organization to execute and automate various processes associated with machine learning.

SUMMARY

Building and deploying machine learning models may require massive information regarding hardware platforms to run the machine learning models. Given that most of the current machine learning models are complex and sophisticated, it would make it costly to benchmark them to measure the performance of the machine learning models. In terms of the machine learning life cycle, most of the machine learning engineers or data scientists may have to build the machine learning models first, then measure various performance metrics of the machine learning models on different hardware. With this process, they may know if candidate machine learning models satisfy given constraints, or run suitably on their hardware platform. However, this process can be very tedious, inefficient, and costly, and can consume significant computing resources. Moreover, most of the inquiries as to model performance may be presented in hypothetical scenarios (e.g., what if I run my machine learning model on a GPU? How fast would it run?).

The present disclosure describes a system that includes a non-transitory memory storing instructions executable to select a suggested hardware platform executing a machine learning model under constraints. The system also includes a processor configured to execute the instructions to obtain input data including a targeted objective and the constraints. The processor may be configured to determine configurations of candidate machine learning models based on the input data. The processor may be configured to virtually execute the candidate machine learning models defined by a hyper-parameter set corresponding to the input data, obtain a virtual performance metrics set of each respective candidate machine learning model from virtual execution of the candidate machine learning models, and generate an evaluation score of each respective candidate machine learning model based on a similarity of the virtual performance metrics set of each respective candidate machine learning model to the targeted objective. The processor may be configured to select a deployable machine learning model having the evaluation score that meets a predetermined criterion from among the candidate machine learning models, virtually execute the deployable machine learning model on each of candidate hardware platforms according to the constraints, and generate an assessment report of the virtual performance metrics set of the deployable machine learning model executed on each of the candidate hardware platforms. The processor may be configured to select the suggested hardware platform meeting the predetermined criterion from among the candidate hardware platforms, the suggested hardware platform probabilistically satisfying the targeted objective under the constraints when combined with the deployable machine learning model for execution.

In some forms of the present disclosure, the processor is further configured to, in response to selecting the suggested hardware platform, generate and deploy the deployable machine learning model, execute the deployable machine learning model on the suggested hardware platform with the input data, provide a feedback associated with a performance of the deployable machine learning model to the system, store the feedback in the non-transitory memory, and update the deployable machine learning model based on the feedback.

The processor may be further configured to output a resource prediction of a combination of the suggested hardware platform and the deployable machine learning model.

When the suggested hardware platform is selected, the processor may be further configured to output a model of an implementation of resource prediction based on the suggested hardware platform, and automatically perform the resource prediction and tasks associated with the resource prediction according to the outputted model.

The candidate hardware platforms may include a plurality of hardware devices or a plurality of cloud instances, where each hardware device of the plurality of hardware devices further includes representational state transfer (REST) application programming interface (API), simulator, and a hardware target.

When the virtual performance metrics set is obtained, the processor may be configured to obtain the virtual performance metrics set of each respective candidate machine learning model from the non-transitory memory, the non-transitory memory pre-storing the virtual performance metrics set of the plurality of machine learning models.

When the configurations of the candidate machine learning models are determined, the processor may be configured to determine whether the configurations of the candidate machine learning models correspond to the input data. In response to determining that the configurations of the candidate machine learning models do not correspond to the input data, the processor may be configured to obtain a different hyper-parameter set, and virtually execute the candidate machine learning models defined by the different hyper-parameter set.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
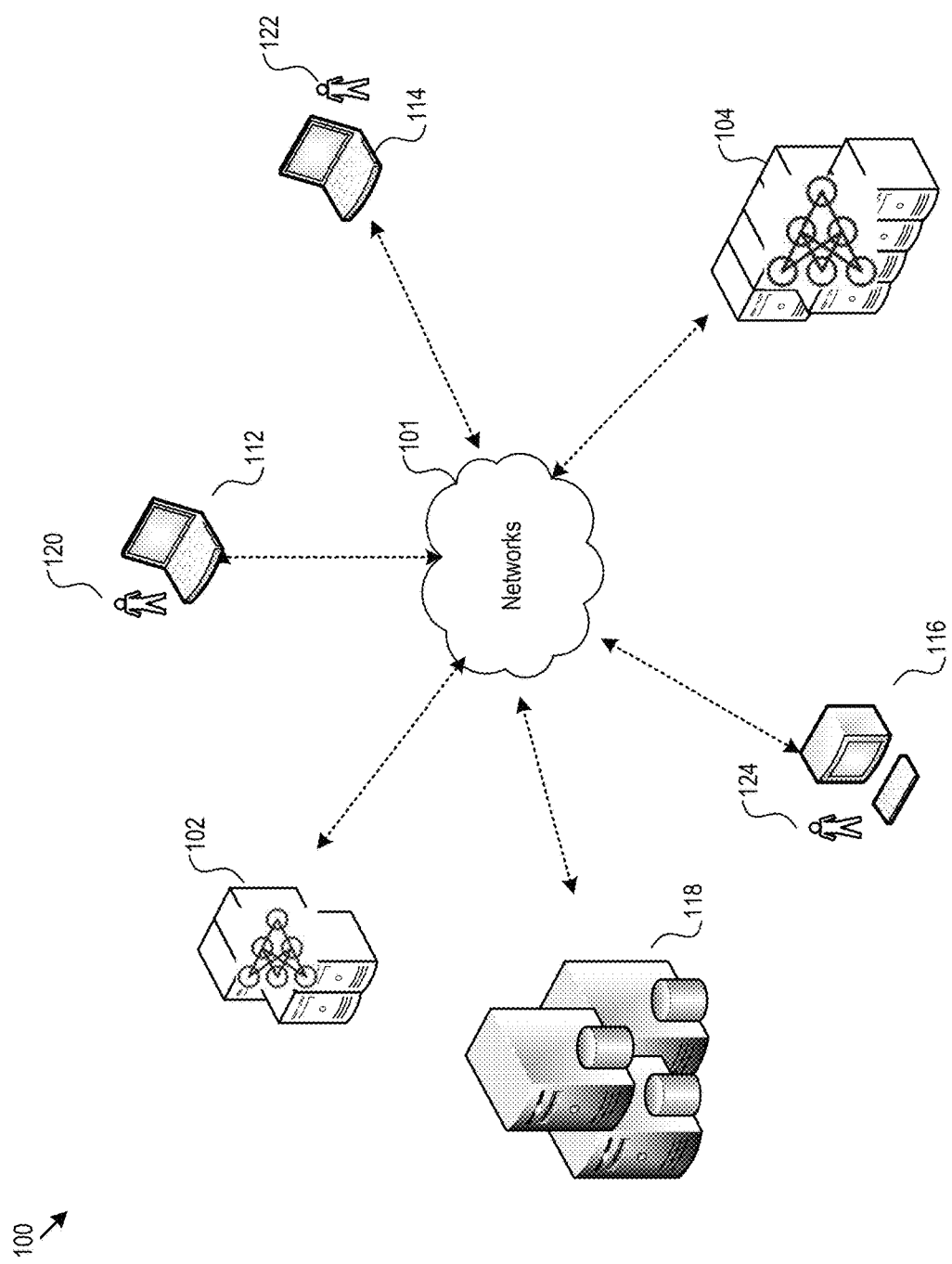
FIG. 1 shows an exemplary electronic communication environment for implementing a resource prediction machine learning system in one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Throughout the specification and claims, terms may have nuanced meanings suggested or implied in context beyond an explicitly stated meaning. Likewise, the phrase "in one embodiment" or "in one implementation" as used herein does not necessarily refer to the same embodiment or implementation and the phrase "in another embodiment" or "in another implementation" as used herein does not necessarily refer to a different embodiment or implementation. It is intended, for example, that claimed subject matter includes combinations of exemplary embodiments or implementations in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" or "at least one" as used herein, depending at least in part upon context, may be used to describe any feature, structure, or characteristic in a singular sense or may be used to describe combinations of features, structures or characteristics in a plural sense. Similarly, terms, such as "a", "an", or "the", again, may be understood to convey a singular usage or to convey a plural usage, depending at least in part upon context. In addition, the term "based on" or "determined by" may be understood as not necessarily intended to convey an exclusive set of factors and may, instead, allow for the existence of additional factors not necessarily expressly described, again, depending at least in part on context.

In general, machine learning models may have different performances (e.g., accuracy, latency, memory consumption, and the like) depending on the type of hardware (e.g., CPU, GPU, FPGA, and the like) or cloud instances executing the machine learning models. Different types of hardware may have different resources, and resource consumption may differ accordingly. When it comes to deployment, predicting the best hardware platform for the deployment of the machine learning models may be desirable because deploying machine learning models may require careful assessment and resource prediction according to the hardware architecture as well as business requirements. However, users typically rely on manual rules or their own judgment to evaluate the performance of machine learning models (e.g., latency, memory, power, and the like) on different hardware. This may add inefficiencies and waste resources.

The present disclosure provides a system for predicting a hardware platform executing machine learning models under constraints without executing the machine learning models in situ. In particular, the present disclosure may enable a user to infer various machine learning model performance metrics without the actual need to run the machine learning models on different hardware platforms and systems. As such, the present disclosure may be able to address the drawbacks and challenges discussed above.

Targeted objective as used herein may refer to user-selected data representing operational parameters of a desired system including a hardware platform and a machine learning model. A certain parameter may be prioritized over other parameters depending on a user selection.

Constraints, as used herein, may refer to a minimum and maximum range of limits that limit the output of a machine learning model. The constraints may be mandated by business, technology, and the like. The constraints may be used to improve the efficiency of the machine learning model and to reduce the search space. The search space may refer to a set of model candidates with different hyper-parameters, hardware platform set, and the like.

A suggested hardware platform as used herein may refer to an optimized or the best performing platform that may execute a machine learning model to achieve the targeted objective under constraints.

A suggested machine learning model as used herein may refer to an optimized or the best performing model that is able to achieve the targeted objective under constraints.

A virtual execution as used herein may refer to a situation where a resource prediction twin may simulate the performance of machine learning models on hardware platforms without actually running the machine learning model.

Candidate machine learning models as used herein may refer to predetermined machine learning models that may correspond to the targeted objective selected based on database storing a plurality of machine learning models, and that are likely to be deployed and achieve the targeted objective by virtually executing the candidate machine learning models using the resource prediction twin.

Candidate hardware platforms as used herein may refer to predetermined hardware platforms that may correspond to the targeted objective selected based on database storing a plurality of hardware platforms, and that are likely to achieve the targeted objective by virtually running the candidate machine learning models using the resource prediction twin.

A deployable machine learning model as used herein may refer to a machine learning model whose evaluation score meets a predetermined criterion based on a similarity of the performance metrics set of the machine learning model to the targeted objective, thereby being deployed by a user. The deployable machine learning model may be selected from the candidate machine learning models.

A hyper-parameter set as used herein may be a set of parameters whose value is used to build a machine learning model, as opposed to other parameters being derived by training. The hyper-parameter set may also define specific properties in the machine learning model structure, training, and deployment.

A performance metrics set as used herein may be a set of metrics used to evaluate the performance of different machine learning models that may be chosen by a user (e.g., model accuracy, power consumption, latency, memory size, and the like).

Configurations, as used herein, may refer to the arrangement or set-up of the hardware platform or machine learning models.

FIG. 1 shows an exemplary electronic communication environment 100 in which a system for predicting a hardware platform executing machine learning models may be implemented. The electronic communication environment 100 may include one or more servers (102 and 104) including a machine learning system for predicting the performance of a suggested hardware platform, one or more user devices (112, 114, and 116) associated with users (120, 122, and 124), and one or more databases 118, in communication with each other via public or private communication networks 101.

Server 102 may be implemented as a central server or a plurality of servers distributed in the communication networks. While the server 102 shown in FIG. 1 is implemented as a single server, the server 102 may be implemented as a group of distributed servers, or may be distributed on the server 104.

The user devices 112, 114, and 116 may be any form of mobile or fixed electronic devices, including but not limited to a desktop personal computer, laptop computers, tablets, mobile phones, personal digital assistants, and the like. The user devices 112, 114, and 116 may be installed with a user interface for accessing a machine learning model for predicting a suggested hardware platform. The one or more database 118 of FIG. 1 may be hosted in a central database server, a plurality of distributed database servers, or in cloud-based database hosts. The database 118 may be organized and implemented in any form, including but not limited to a relational database containing data tables, a graphic database containing nodes and relationships, and the like. The database 118 may be configured to store the intermediate data and/or final results for implementing a machine learning model for predicting a suggested hardware platform.

Figure 2:
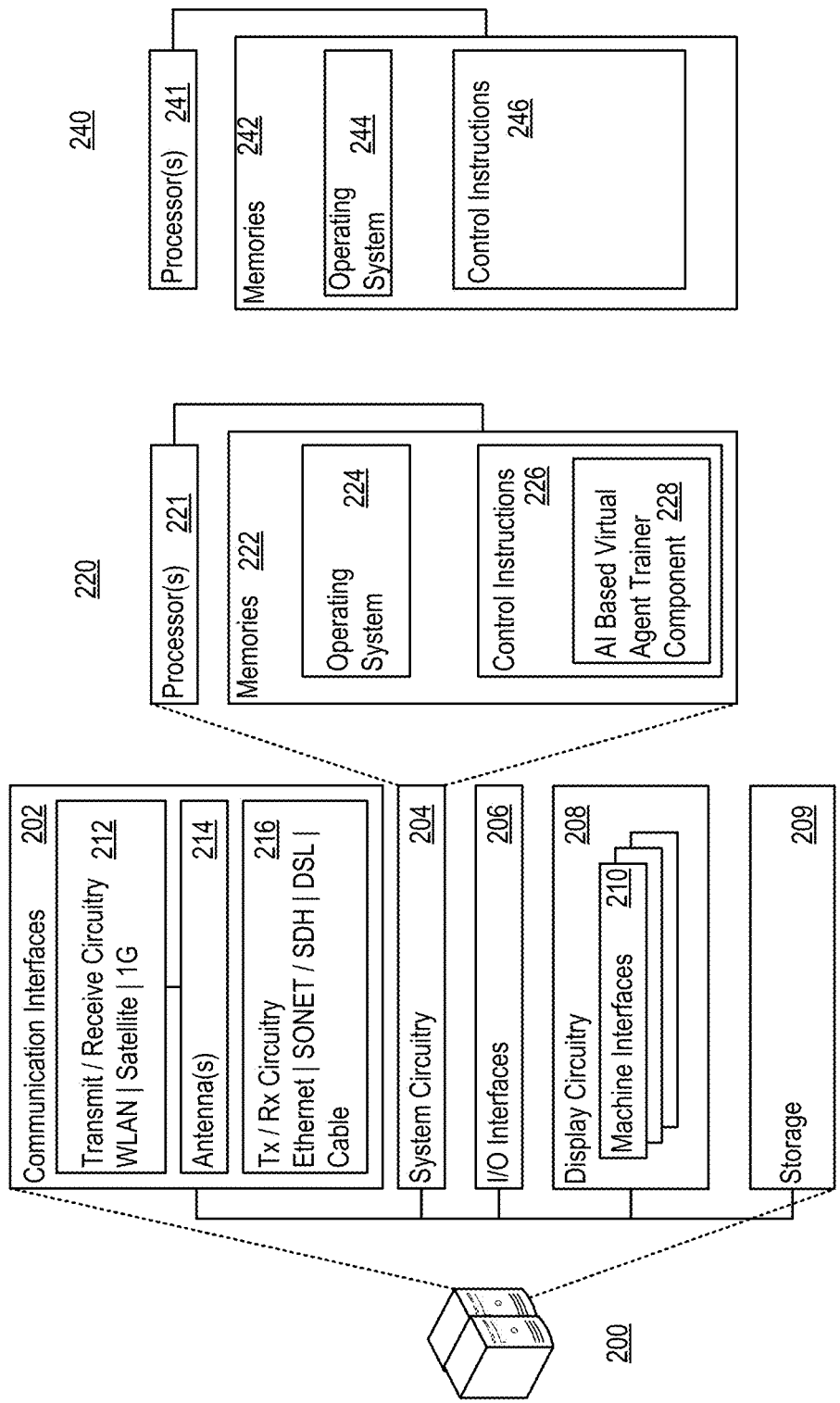
FIG. 2 shows computer systems that may be used to implement various components of the electronic communication environment of FIG. 1 in one form of the present disclosure.

FIG. 2 shows an exemplary system, which is a computer system 200 for implementing the server 102 including the machine learning model for predicting the suggested hardware platform, or the user devices 112, 114, and 116. The computer system 200 may include communication interfaces 202, system circuitry 204, input/output (I/O) interfaces 206, storage 209, and display circuitry 208 that generates machine interfaces 210 locally or for remote display, e.g., in a web browser running on a local or remote machine. The machine interfaces 210 and the I/O interfaces 206 may include GUIs, touch-sensitive displays, voice or facial recognition inputs, buttons, switches, speakers, and other user interface elements. Additional examples of the I/O interfaces 206 include microphones, video and still image cameras, headset and microphone input/output jacks, Universal Serial Bus (USB) connectors, memory card slots, and other types of inputs. The I/O interfaces 206 may further include magnetic or optical media interfaces (e.g., a CDROM or DVD drive), serial and parallel bus interfaces, and keyboard and mouse interfaces.

The communication interfaces 202 may include wireless transmitters and receivers ("transceivers") 212 and any antennas 214 used by the transmitting and receiving circuitry of the transceivers 212. The transceivers 212 and antennas 214 may support Wi-Fi network communications, for instance, under any version of IEEE 802.11, e.g., 802.11n or 802.11ac. The communication interfaces 202 may also include wireline transceivers 216. The wireline transceivers 116 may provide physical layer interfaces for any of a wide range of communication protocols, such as any type of Ethernet, data over cable service interface specification (DOCSIS), digital subscriber line (DSL), Synchronous Optical Network (SONET), or other protocol.

The storage 209 may be used to store various initial, intermediate, or final data or models for implementing the suggested hardware platform prediction. These data corpus may alternatively be stored in the database 118 of FIG. 1. In one form of the present disclosure, the storage 209 of the computer system 200 may be integral with the database 118 of FIG. 1. The storage 209 may be centralized or distributed, and may be local or remote to the computer system 200. For example, the storage 209 may be hosted remotely by a cloud computing service provider.

The system circuitry 204 may include hardware, software, firmware, or other circuitry in any combination. The system circuitry 204 may be implemented, for example, with one or more systems on a chip (SoC), application-specific integrated circuits (ASIC), microprocessors, discrete analog and digital circuits, and other circuitry.

For example, at least some of the system circuitry 204 may be implemented as processing circuitry 220 for the server 102 including a machine learning predicting a suggested hardware platform of FIG. 1. The processing circuitry 220 of the machine learning predicting the suggested hardware platform may include one or more processors 221 and memories 222. The memories 222 stores, for example, control instructions 226 and an operating system 224. The control instructions 226, for example, may include instructions for implementing the components 228 of the machine learning predicting the suggested hardware platform. The hardware platform may include platforms associated with hardware devices, cloud instances, accelerators, and the like. A hardware device may further include representational state transfer (REST) application programming interface (API), simulator, a hardware target, and the like. In one implementation, the instruction processors 221 execute the control instructions 226 and the operating system 224 to carry out any desired functionality related to the machine learning model predicting the suggested hardware platform.

Alternatively, or in addition, at least some of the system circuitry 204 may be implemented as client circuitry 240 for the user devices 112, 114, and 116 of FIG. 1. The client circuitry 240 of the user devices may include one or more instruction processors 241 and memories 242. The memories 242 stores, for example, control instructions 246 and an operating system 244. In one implementation, the instruction processors 241 execute the control instructions 246 and the operating system 244 to carry out any desired functionality related to the user devices.

Figure 3:
FIG. 3 shows a diverse human skillset in building machine learning models.

FIG. 3 shows a diverse skillset required at various stages in building machine learning models.

Referring to FIG. 3, some existing methods of building a machine learning model may use inputs of human experts from a diverse human skillset, which may include, but are not limited to, data scientists 311, machine learning engineers 321, hard/firmware engineers 331, platform engineers 341, and/or manager/principal scientists 351. An existing method with an end-to-end pipeline to build machine learning models may include inputs of different experts to make choices at different stages mainly based on their intuition and existing architectures. This method may produce too many options and may have high expenses in terms of time, expertise, experiences, and/or computational power.

For example, a user at the submission stage may want to know which hardware configuration (e.g., CPU, GPU, memory, and the like) would meet the user's targeted objective and constraints (e.g., budget cannot be over a certain amount, interference time has an upper limit, and the like). In another example, the user may wish to know how long it would take to run the user's image recognition model on a GPU vs a CPU. The user may also want to find out the resources that may be needed to implement certain upgrades of the user's image recognition model, and if so, whether it would be worth it. In addition, the user may wonder what GPU configuration he or she should choose from among various GPU configurations without actually running the machine learning model on different hardware platforms.

At the assessment stage, the user may take a guess at the performance of machine learning models executing on different hardware platforms relying on his or her past experiences if no machine learning models predicting a suggested hardware platform under constraints were available. Alternatively, the user may see what other people have chosen for their tasks and follow their decisions. As a result, the user may end up selecting a hardware platform ill-fitted to deploy the machine learning models. Also, at the assessment stage, the user may ask what trade-off would be when using one hardware platform versus another hardware platform.

At the execution stage, an IT manager may alert the user if running a requested job violates resource constraints. Additionally or alternatively, the IT manager may decide the requested job would be completed, but waste resource under the constraints. In such cases, the user may have to resubmit a different task aiming a different hardware platform (e.g., platforms associated with hardware devices, cloud instances, accelerators, and the like) at the submission stage. As such, an existing or conventional process to determine or predict a suggested hardware platform executing machine learning models may require inputs from experts and user interactions, which may be time-consuming and expensive.

In contrast, the present disclosure relates to predicting a suggested hardware platform for training or deploying a certain machine learning model under constraints, which may overcome some of the challenges and drawbacks discussed in connection with the existing methods. Specifically, the present disclosure provides a different way of automatically predicting the machine learning model before deployment and suggesting a hardware platform for deployment. More specifically, at the model creation stage 310 a machine learning model may be trained according to a model type, hyper-parameters, model architecture, training strategy, and business requirements. One of the main goals at the model creation stage 310 may be to create a machine learning model with high accuracy (e.g., train a specific machine learning model with the highest accuracy). Then, at the constraint adoption stage 320, inputs concerning a model type, hyper-parameters, model architecture, training/validation strategy may be taken with an emphasis on a constraint-aware multi-objective optimization such as a multi-objective Bayesian optimization genetic algorithm (MOBOGA) architecture described in U.S. application Ser. No. 16/749,717, which is herein incorporated by reference in its entirety. The main goal of the constraint adoption stage 320 may be to create a machine learning model with reliable performance subject to resource constraints. For example, the constraint adoption stage 320 may deal with how to re-build the machine learning model that was created at the model creation stage 310 with specific constraints (e.g., 50 hours given to execute the machine learning model on a specific hardware platform, machine learning model size less than 1 GB, $500 budget for a machine learning model training). There may be one or more constraints both in a training model (e.g., hardware constraints, a memory size, a CPU computing power, training data, and/or resource) and a production model (e.g., performance constraints, data constraints, and/or runtime environment constraints).

The hardware adaptation stage 330 may implement the machine learning model for predicting the suggested hardware platform, also referred to as a resource prediction twin. In implementing the resource prediction twin, the hardware/firmware engineers 331 may incorporate some of the features used in MOBOGA. The resource prediction twin may enable inference of various machine learning model metrics without actually running each machine learning model on different hardware platforms. At the hardware adaptation stage 330, a focus is on creating a hardware platform to compare various machine learning models' attributes with respect to different hardware platforms (e.g., compare the power usage, cost, latency and accuracy of two different machine learning models on FPGA, GPU, and CPU; what happens to accuracy and cost if a machine learning model is retrained for 50 iterations).

The deployment stage 340 may perform multiple tests on the machine learning model and deploy the machine learning model to execute on the suggested hardware platform. The production and monitoring stage 350 may involve error handling to maintain a stable machine learning model execution on the suggested hardware platform subject to business goals.

Figure 4:
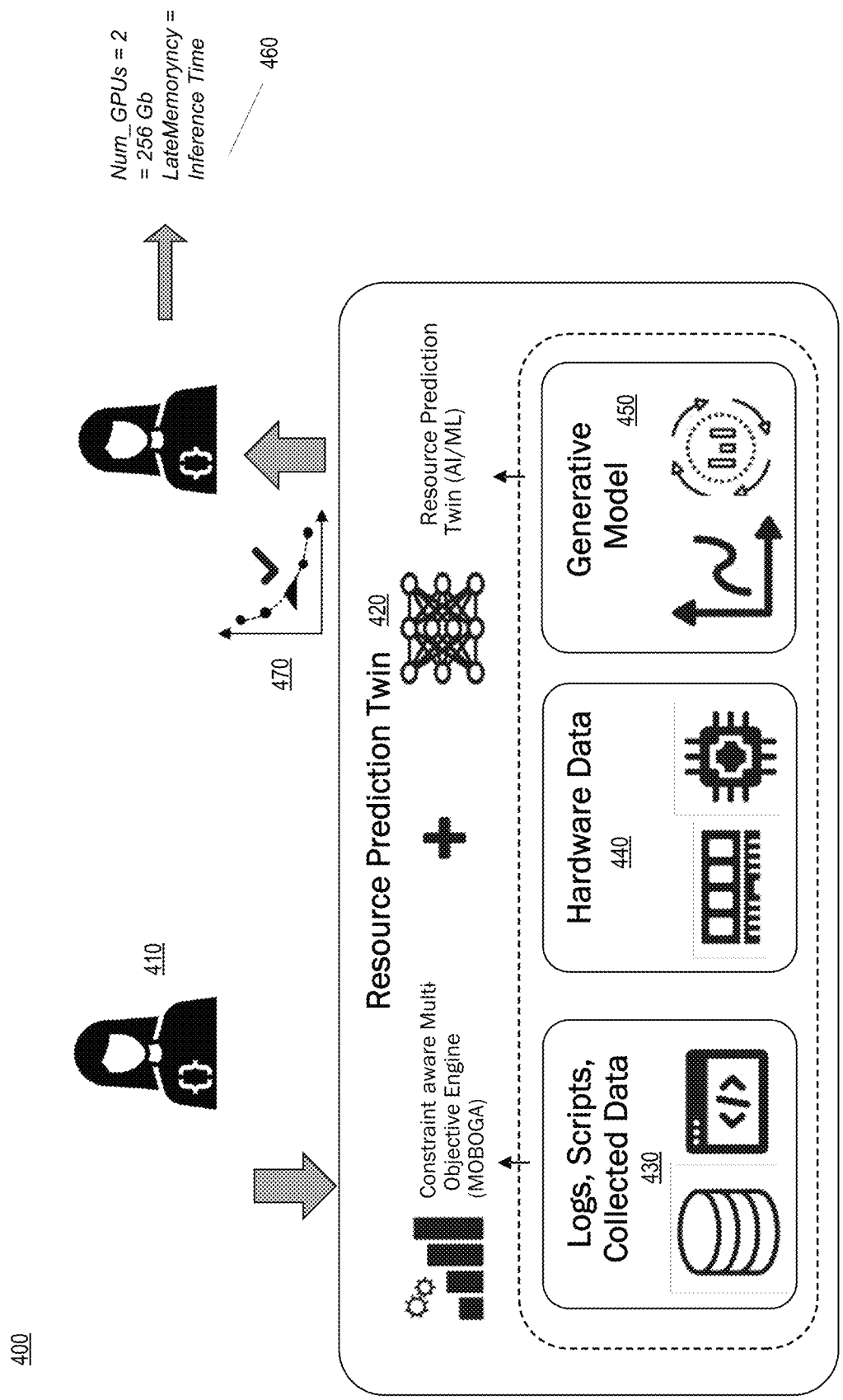
FIG. 4 shows an embodiment of a resource prediction twin.

FIG. 4 shows an embodiment of a machine learning model predicting a model performance. As a general matter, the resource prediction twin 420 may output a prediction of the resources (e.g., hardware, platform, cloud instances, and the like) required for running the machine learning model. Examples of items that the resource prediction twin 420 may output include (i) trade-off between estimated cost and runtime for a different number of GPUs and memory, (ii) cost and performance options for a certain job. Additionally or alternatively, the resource prediction twin may output the prediction of a resource based on logs, scripts, and collected data 430, or hardware data 440. In the case of 430, the resource prediction twin 420 may predict metrics. For example, the resource prediction twin 420 may predict how long each would take to complete a job if the user 410 wants to run the job on a GPU versus CPU. Conversely, in the case of 440, the resource prediction twin 420 may predict parameters. For example, the resource prediction twin may predict a model configuration that may satisfy target values under the constraints given a certain resource (e.g., memory less than 1 GB) limitation on the system.

The resource prediction twin 420 may benefit the user 410 by generating predictions for how to satisfy several competing goals without wasting time in running an actual machine learning model, or benchmarking different models. In some forms of the present disclosure, the resource prediction twin 420 may combine the MOBOGA to provide the user 410 with trade-offs for each of their candidate machine learning models. This will be explained in greater detail in connection with FIG. 7 and FIG. 8.

The resource prediction twin 420 may utilize a generative model 550 that is trained using probabilistic programming. It may be trained on parameters of the model and measured (observed) metrics. The probabilistic programming system will be explained with reference to FIG. 5.

In order to output the prediction of resource, the resource prediction twin 420 may be trained on a wide variety of data from different resources. However, the capability of the resource prediction twin 420 to output the prediction of resource may depend on the type of a machine learning model (e.g., time series prediction model, neural network architecture model, and the like).

The resource prediction twin 420 may output the prediction of a resource by providing the trade-off between optimized cases and their targeted objectives (e.g., inference time, memory, latency, model accuracy, and the like). These optimal cases may be called Pareto-Optimal options 470. For example, in outputting the prediction of resource as shown in 460, the resource prediction twin 420 may provide trade-offs between estimated cost and runtime for a different number of GPUs and memory.

Figure 5:
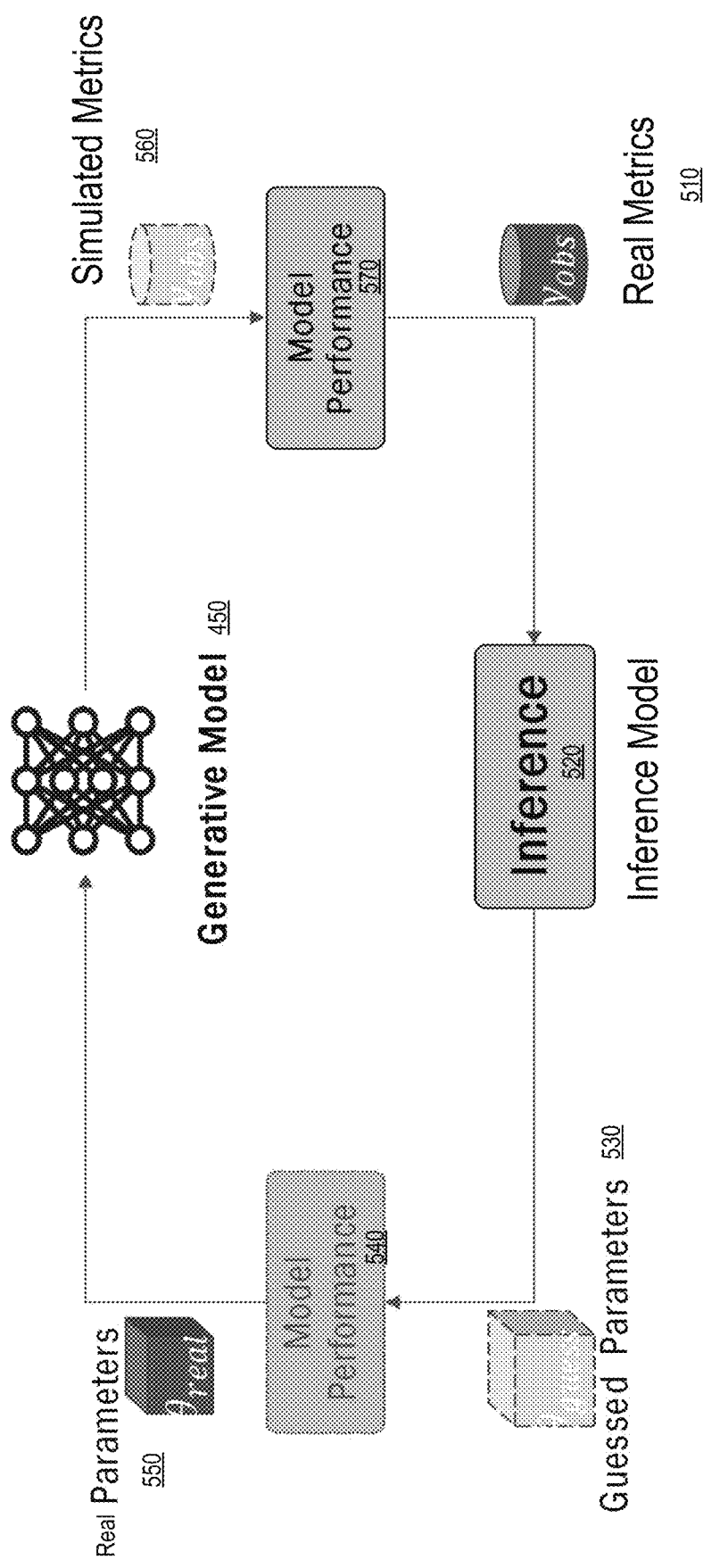
FIG. 5 shows another embodiment of the resource prediction twin.

FIG. 5 shows an example of a probabilistic model predicting virtual metrics when real metrics are given.

Real metrics 510, such as observed metrics, may go through an inference model 520. The inference model 520 may receive input data and generate probabilistic models that can explain the input data. The inference model 520 may be initialized with guessed parameters 530 (virtual parameters). After the guessed parameters 530 are input to a model performance 540, real parameters 550 may be produced. The generative model 450 may yield simulated data based on guessed parameters 530. When the simulated metrics 560 pass through a model performance 570, then the real metrics 510 may be rendered.

In one example, the user 410 may want to know, for example, which machine learning model would be a suggested machine learning model to run under user-defined objectives input to the system as targeted objective. For example, the user 410 may have defined objectives of hardware with 80% accuracy and 100 GB of memory, which is input as targeted objective to the system as real metrics 510. At this point, without executing an actual machine learning model, the resource prediction twin 420 may use the inference model 520 to infer necessary parameters (initializing the probabilistic model's guessed parameters 530, and obtaining the real parameters 550 after running probabilistic programming) in order to achieve the targeted objective input as the real metrics 510. Then, the resource prediction twin 420 may utilize the performance model 540 to predict the real parameters 550 to be combined with the real metrics 510 to achieve the user 410 objectives represented by the targeted objective. The resource prediction twin 420 may run the real parameters 550 through the generative model 450 to yield the simulated metrics 560. Additionally or alternatively, the resource prediction twin 420 may start with the real parameters 550 as the targeted objective to predict the real metrics 510 if the user 410 wants to know which hardware would optimally execute a machine learning model to achieve the targeted objective under the constraints. Here, real metrics 510 may be the data to collect (e.g., model configurations, hardware type, model accuracy, memory use, latency, inference). Real parameters 550, on the other hand, may be the inference model 520 parameters.

In general, the resource prediction twin 420 may utilize a generative model trained using a probabilistic programming. The probabilistic programming may build generative models as programs to solve inference programs from observed incomplete data. By providing the data generation process as a program, the probabilistic programming will automatically perform the inference problem. The uncertainties in these parameter estimates will also be quantified. Therefore, probabilistic programming may capture the real-world process of data generation, whereas traditional or conventional machine learning model does feature engineering and transformation to make data fit into a model.

Figure 6:
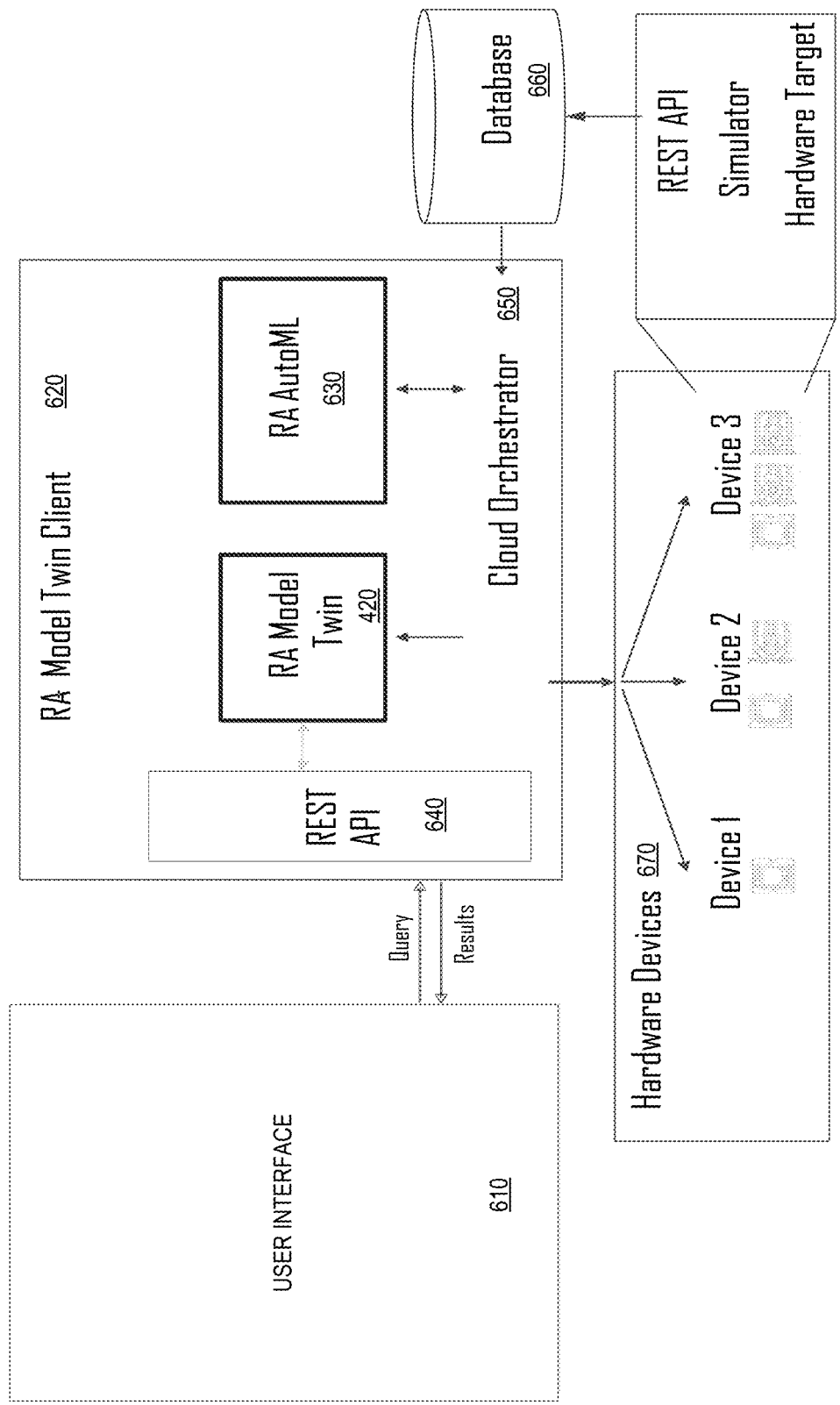
FIG. 6 shows the architecture of a machine learning model in one form of the present disclosure.

FIG. 6 shows an exemplary architecture 600 of the resource prediction twin in one form of the present disclosure.

As a general matter, the resource prediction twin architecture 600 may be created from different machine learning models trained on different hardware platforms. The input data may include model hyper-parameters, model architecture, constraints, targeted objective, hardware profile, model performances, constraints and other metrics. The user 410 does not interact with the resource prediction twin 420 before it is created. Generation of the resource prediction twin 420 may be called a creation stage.

During the creation stage, the resource-aware automated machine learning model 630 may set up the process with a cloud orchestrator 650 for training. Details on training with static batch data will be explained elsewhere, such as in the example discussed with reference to FIG. 9. A resource-aware model prediction twin client 620 may include the resource prediction twin 420, a resource-aware automated machine learning 630, representational state transfer (REST) application programming interface (API) 640, and cloud orchestrator 650. However, the resource-aware automated machine learning model 630 may be used for an initial set up only. After the setup, the cloud orchestrator 650 may communicate with hardware devices 670 to execute and train the machine learning models on different hardware devices (e.g., device 1, device 2, device 3) with various input data to obtain the performance metrics set of the machine learning models. The resource-aware automated machine learning model 630, the cloud orchestrator 650, database 660, and hardware devices 670 may be used for training only. Here, the performance metrics of each device may be represented in terms of a representational state transfer (REST) application programming interface (API), a simulator, and a hardware target. The actual performance metrics of each device in conjunction with the targeted objective may be stored in database 660, and provided to the cloud orchestrator 650. Then, the performance metrics of each device may be provided to the resource prediction twin 420 as feedback, and the resource prediction twin 420 may be updated regularly based on the feedback. Details on updating the resource prediction twin 420 with new performance metrics are explained elsewhere, including in association with the example of FIG. 9. Although FIG. 6 describes three hardware devices 670, the resource prediction twin architecture 600 may be expanded with no limits by adding more hardware devices 670 infrastructure into the resource prediction twin architecture 600.

After the resource prediction twin 420 is created, the user 410 may now interact with the resource prediction twin 420. At this stage, the resource prediction twin 420 may output a prediction of the best hardware platform to deploy a machine learning model under constraints without actually running the machine learning model on the hardware platform. This stage may be called an exploration stage. In particular, the resource prediction twin 420 may specify a desirable machine learning model that the user 410 may want to inquire about. In doing so, the user 410 may provide the input data, including, but not limited to, a model type, hyper-parameter, targeted objective, and constraints.

Specifically, in the exploitation stage, when the user 410 inputs the targeted objective under constraints via a user interface 610, the REST API 640 may interact with the resource prediction twin 420 to get an answer to the query without actually running the query on the hardware devices 670. Then, the REST API 640 may provide results back to the user 410. For example, user 410 may want to know a latency of a specific machine learning model on different hardware devices under constraints. In another example, the user 410 may ask which machine learning model would be a suggested machine learning model for specific hardware parameters. Here, the constraints may refer to, including, but not limited to, resource, time, and memory. In response to user 410 inquiry, in the exploration stage, the resource prediction twin 420 may provide the user 410 trade-offs of the performance of each machine learning model executing on different hardware platforms, which will be explained in detail in FIG. 8. For example, if the user 410 wants to inspect cracks in bridges using drones, the resource prediction twin 420 may provide automated guidance to the user 410 to decide which hardware to deploy for these particular drones. In some forms of the present disclosure, according to the deployed hardware platform, the resource prediction twin 420 may automatically assign resources to proper task handlers.

Figure 7:
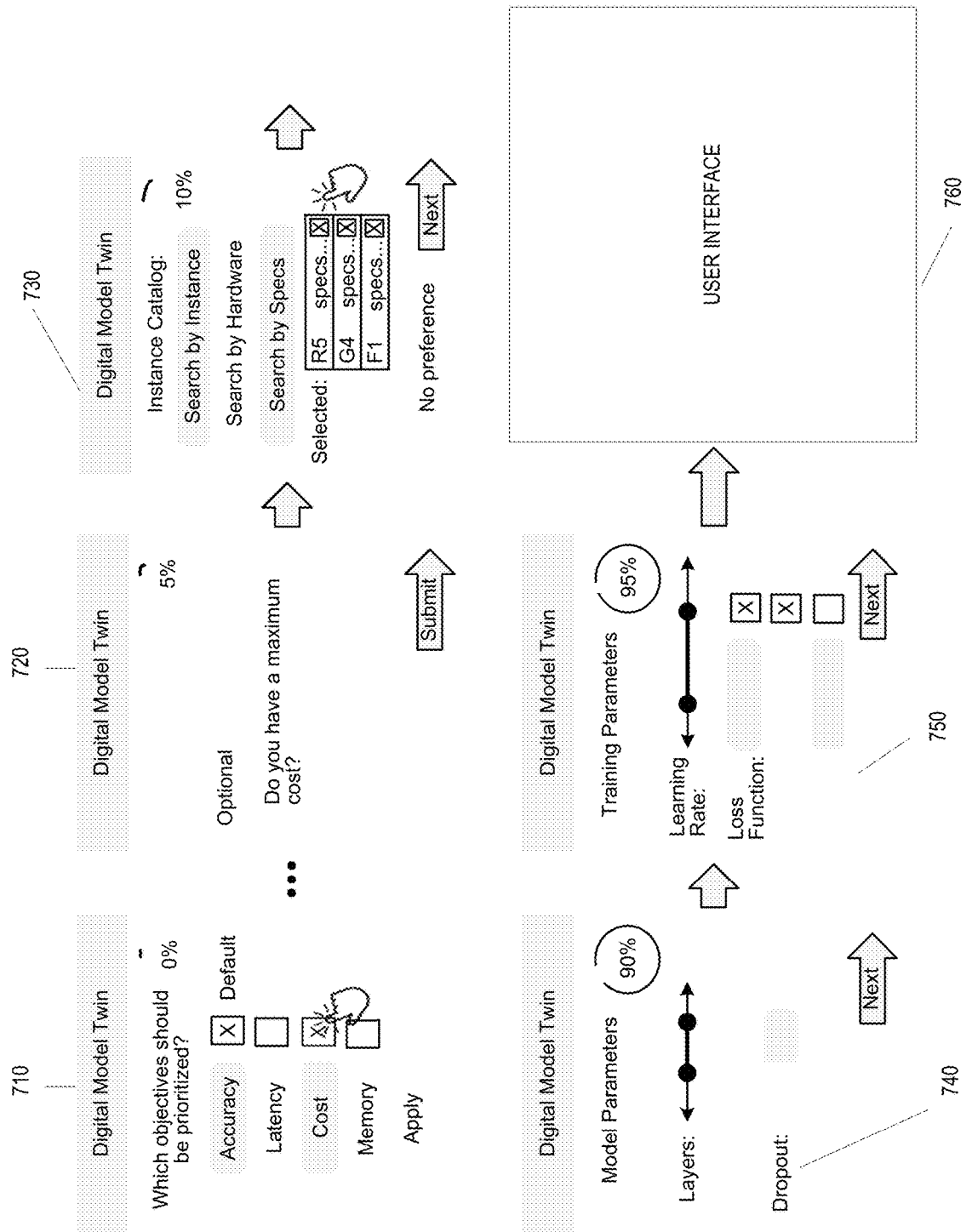
FIG. 7 shows an illustrative example of utilizing a machine learning model in one form of the present disclosure.

FIG. 7 shows an illustrative example of utilizing the resource prediction twin in some forms of the present disclosure.

At 710: the user 410 may choose on the user interface 610 targeted objective (e.g., accuracy, latency, cost, memory, and the like) that should be prioritized when executing on a hardware platform. The targeted objective may be user-selected data representing operational parameters of a desired system including a hardware platform and a machine learning model. For example, the user 410 may select accuracy and cost to be the targeted objective among other parameters (e.g., memory usage, time, latency, and the like). Then, the resource prediction twin 420 may compare each candidate machine learning model based on the targeted objective ("accuracy" and "cost" in this case). In doing so, the resource prediction twin 420 may add more importance to "accuracy" than "cost" if the user 410 prioritized "accuracy" when input data including the targeted objective was entered.

At 720: the user 410 may be invited to input budget/cost information.

At 730: the user 410 may select candidate machine learning models the user 410 wants to deploy according to the user 410 input data including the targeted objective.

At 740/750: the resource prediction twin 420 may virtually execute the selected candidate machine learning models and provide performance metrics of each of the selected candidate machine learning models.

At 760: the resource prediction twin 420 may compare each of the selected candidate machine learning models according to the targeted objective. Further, the resource prediction twin 420 may suggest a machine learning model that was optimally designed to achieve the targeted objective under the constraints without running each of the selected candidate machine learning models with the input data.

Figure 8:
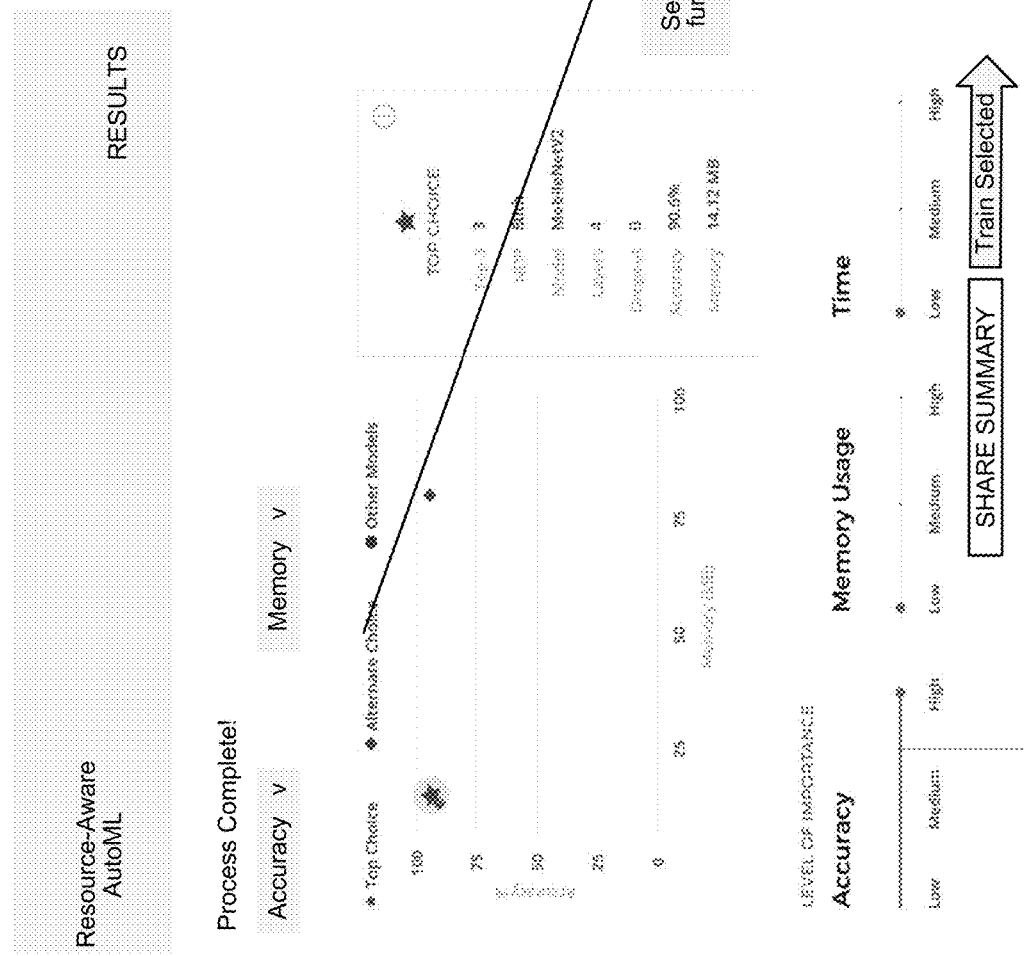
FIG. 8 shows an illustrative example of utilizing a machine learning model in one form of the present disclosure.

FIG. 8 shows an illustrative example of utilizing the resource prediction twin in connection with FIG. 7.

At 810: The resource prediction twin 420 may compare all candidate machine learning models according to the targeted objective. Here, the resource prediction twin 420 may compare each candidate machine learning model based on accuracy and memory usage. The resource prediction twin 420 may suggest a suggested machine learning model that would be best suited to achieve the targeted objective.

At 820: If the user 410 wishes to further compare each candidate machine learning model based on the performance of each candidate machine learning model executed on different hardware devices, the user 410 may have an option to do so. If the user 410 exercises that option, the resource prediction twin 420 may compare the respective machine learning model on a detailed level (e.g., memory, accuracy, overhead cost, operational cost, latency, and the like) and even provide trade-offs to the user 410. For example, the resource prediction twin 420 may answer at 820 to the user 410 query such as how much time or money the user 410 would save by choosing the best trade-off. The resource prediction twin 420 may provide the user 410 trade-offs of the performance of the respective machine learning model executing on different hardware.

In an update stage, the user 410 may deploy when the user 410 selects a machine learning model that may be optimized to achieve the targeted objective when executed on a specific hardware device, and then the selected machine learning model will be deployed to train itself with given parameters. Additionally or alternatively, the user may deploy a machine learning model based on suggestions performed by the resource prediction twin 420. For example, if the user 410 wants to inspect cracks in bridges using a drone, the resource prediction twin 420 may provide automated guidance to the user 410 to decide which hardware platform to deploy for this particular drone given the objectives prioritized. The performance of the selected machine learning model on the actual hardware may be fed to the resource prediction twin 420, thereby updating the resource prediction twin 420. The resource prediction twin 420 may incrementally and instantaneously update itself whenever the performance metrics of the selected machine learning model are fed. Details on updating the resource prediction twin 420 with new performance metrics will be explained in FIG. 9. Accordingly, as the process of training and updating may be done on a real-time basis, the resource prediction twin 420 may be stored in the knowledge base such that the resource prediction twin 420 may provide the performance metrics of different machine learning models immediately.

Figure 9:
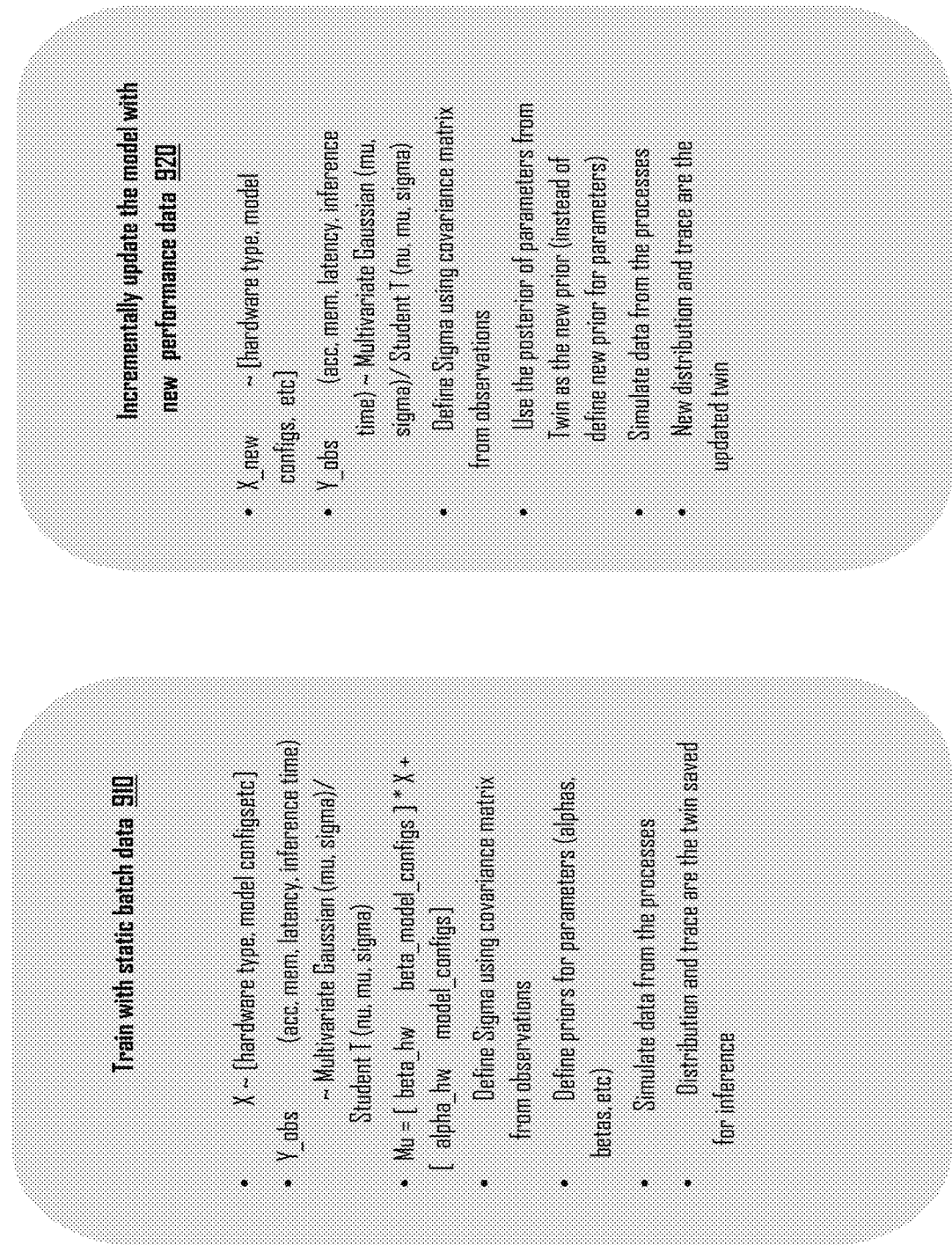
FIG. 9 shows details of training and updating a machine learning model in one form of the present disclosure.

FIG. 9 shows details of training and updating the resource prediction model in some forms of the present disclosure.

First, details of training with static batch data is explained in 910. Specifically, the input data may include hardware type, model configurations, and the like. The X variables vector may contain information like hardware type, model configurations, and the like. The Y vector may contain data collected on different hardware platforms (e.g., accuracy, memory, latency and inference time of the model). Then, a probabilistic graphical model may be fit to the data (likelihood of observations may be a multivariate normal, or multivariate student t, or more complex hierarchical probability models). In order to apply the processes, the priors for the processes' parameters including mean and variance may be defined. The probabilistic programming may simulate the data from the processes, and the posterior distribution and traces may be saved as the inference model.

The simulated metrics may be represented in terms of accuracy, memory, latency, and inference time. (e.g., Y_obs (accuracy, memory, latency, inference time)~Multivariate Gaussian (mu, sigma)/Student T (nu, mu, sigma)).

Mu can be calculated using the following equation:

$$Mu=[beta\_hw, beta\_model\_configs]*X+[alpha\_hw, model\_configs]$$

Here, sigma may be defined using a covariance matrix from observations. After simulating data, distribution and traces may be saved for the inference program 520.

920 shows how the model may be updated when new performance data is collected. It may follow a similar workflow as 910, but instead of defining priors from scratch, the distribution from the posterior may be extracted, and the mean and variance may be used as the new priors. The remaining process may be the same as 910.

X _new~[hardware type, model configurations, etc]

Y_obs (accuracy, memory, latency, inference time)~Multivariate Gaussian (mu, sigma)/Student T (nu, mu, sigma)

Here, the posterior of parameters from the resource prediction twin 420 may be used as the new prior instead of defining a new prior for parameters. After simulating data, distribution and traces may be updated for the resource prediction twin 420.

Figure 10:
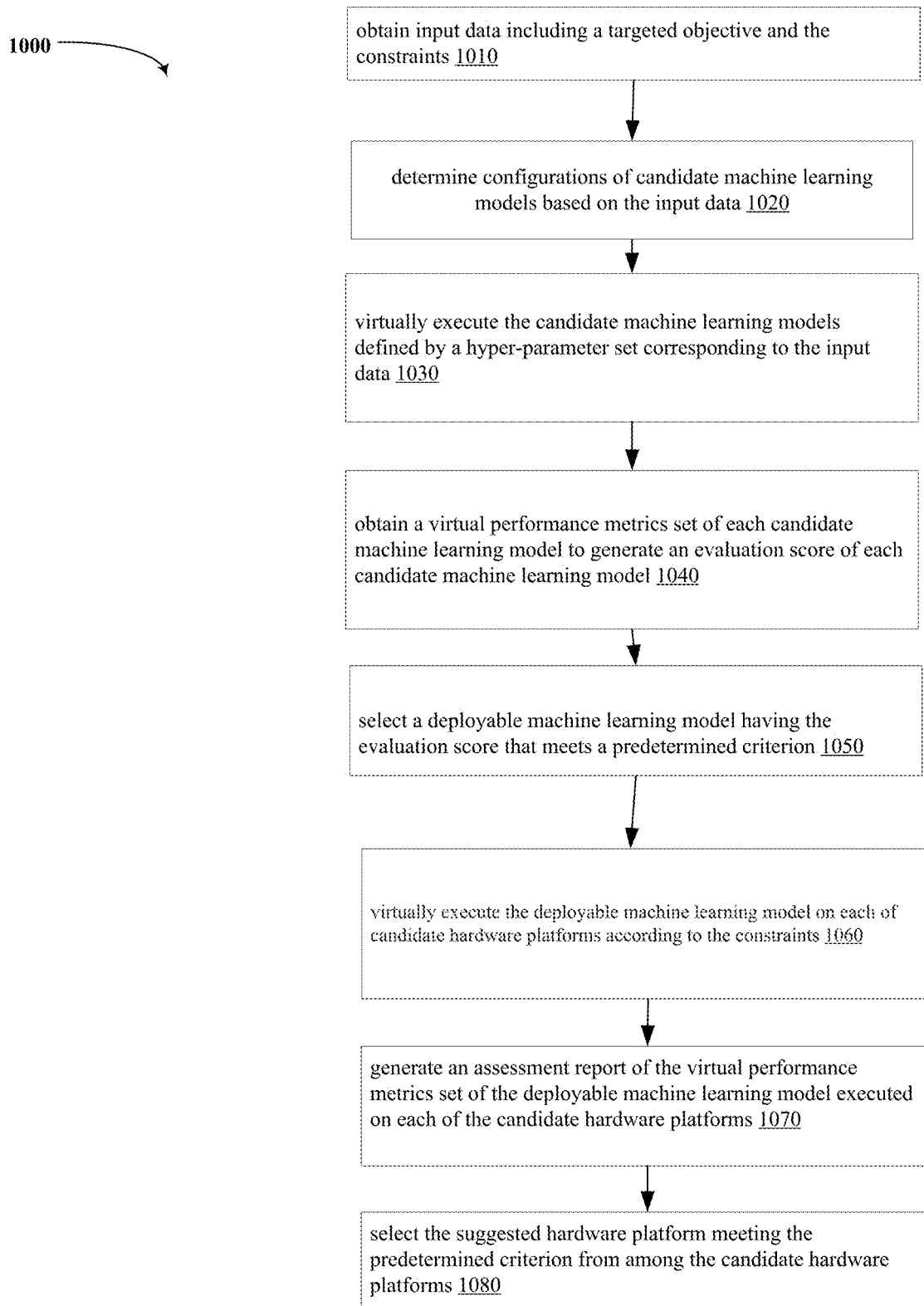
FIG. 10 shows a flow diagram of a method for predicting a suggested hardware platform for executing machine learning models in one form of the present disclosure.

FIG. 10 shows a flow diagram of a method for predicting a suggested hardware platform for executing machine learning models in some forms of the present disclosure.

At 1010: The system may obtain input data including targeted objective (e.g., accuracy, latency, cost, memory, and the like) and constraints via the user interface 610. There may be one or more constraints (e.g., hardware constraints, memory size, CPU computing power, training data, resource, performance constraints, data constraints, and runtime environment constraints). For example, if the user 410 wishes to know the best performing hardware platform to run a specific machine learning model under the constraints (e.g., memory capacity less than 1 GB, and budget under $1,000), such requirements may be input as shown in FIG. 7

At 1020: configurations of candidate machine learning models may be determined based on the input data. Candidate machine learning models may refer to predetermined machine learning models that may correspond to targeted objective selected based on database storing a plurality of machine learning models, and that are likely to be deployed and achieve targeted objective by virtually executing the candidate machine learning models using the resource prediction twin 420. In some forms of the present disclosure, whether the configurations of the candidate machine learning models correspond to the input data may be determined. When it is determined that the configurations of the candidate machine learning models correspond to the input data, then the candidate machine learning models corresponding to the input data may be selected from among a plurality of machine learning models. The plurality of machine learning models may have been executed and trained with a plurality of data including the input data. The data may refer to different types of data that may be used to train different kinds of machine learning models before actually running a specific machine learning model. Conversely, when it is determined that the configurations of the candidate machine learning models do not correspond to the input data, then a different hyper-parameter set may be obtained, and the candidate machine learning models defined by the different hyper-parameter set may be virtually executed.

At 1030: the candidate machine learning models defined by a hyper-parameter set corresponding to the input data may be virtually executed. The virtual execution as used herein may refer to a situation where the resource prediction twin 420 may simulate the performance of machine learning models on the hardware platforms without actually running the machine learning model. The hyper-parameter set may be a set of parameters whose value is used to control the machine learning process, as opposed to other parameters being derived by training. In general, different machine learning models may include different hyper-parameter sets. A hyper-parameter is a parameter whose value may be predetermined before the learning/training process may begin. Given a hyper-parameter set for a particular machine learning model, the training algorithm may learn other parameters from the training data or targeted objective. The machine learning models may require different constraints, and the hyper-parameter may be changed according to the constraints. In some forms of the present disclosure, an initial hyper-parameter set may be obtained, and the initial hyper-parameter set may be used as a hyper-parameter set.

At 1040: A virtual performance metrics set of each respective candidate machine learning model may be obtained. An evaluation score may be determined based on a similarity of the virtual performance metrics set of each respective candidate machine learning model to the targeted objective. If the virtual performance metrics set is similar or close to the targeted objective, that candidate machine learning model may have a better evaluation score than the candidate machine learning model deviating from the targeted objective. In some forms of the present disclosure, the virtual performance metrics set of a plurality of machine learning models including each respective candidate machine learning model may be pre-stored in the database 660 in order to provide the virtual performance metrics set immediately upon request.

At 1050: a deployable candidate machine learning model that has an evaluation score meeting a predetermined criterion may be selected from among the candidate machine learning models. Here, the user 410 may only be interested in the best performing machine learning model that might be combined with a corresponding hardware platform to achieve the targeted objective. The deployable machine learning model may refer to a machine learning model whose evaluation score meets a predetermined criterion based on a similarity of the performance metrics set of the machine learning model to the targeted objective, thereby being deployed by a user 410. The deployable machine learning model may be selected from the candidate machine learning models. The predetermined criterion may be set up by the user 410 that may depend on the input data.

At 1060: the resource prediction twin 420 may virtually execute the deployable candidate machine learning model on each of candidate hardware platforms according to the constraints. Here, the resource prediction twin 420 does not actually run the candidate hardware platforms applied to the deployable machine learning model.

At 1070: The resource prediction twin 420 may generate an assessment report (e.g., trade-offs) of the virtual performance metrics set of the deployable machine learning model executed on each of the candidate hardware platforms. Referring to FIG. 8, the resource prediction twin 420 may compare the deployable machine learning model executed on the candidate hardware platforms according to the targeted objective (e.g., whether an objective is on the accuracy or memory capacity). In doing so, the resource prediction twin 420 may provide trade-offs of choosing one hardware platform versus the other hardware platform in terms of accuracy, memory, overhead cost, operational cost, and latency. These parameters are merely examples and may include additional or alternative requirements that may be input.

At 1080: The resource prediction twin 420 may answer the user 410 inquiry at 1010 (e.g., the best performing hardware platform to run a specific machine learning model under the constraints) by indicating how the hyper-parameter set including different hardware platforms would perform when the deploying machine learning model is executed on different hardware platforms. The resource prediction twin 420 may determine whether the hyper-parameter set would satisfy the predetermined criterion. The user 410 may then decide which hardware platform to use based on a result of determination by the resource prediction twin 420. In some forms of the present disclosure, a suggested hardware platform meeting the predetermined criterion may be selected from among the candidate hardware platforms, where the suggested hardware platform probabilistically satisfying the targeted objective under the constraints when combined with the deployable machine learning model for execution in connection with the process described in FIG. 5. Additionally or alternatively, the resource prediction twin may output a resource prediction of a combination of the suggested hardware platform and the deployable machine learning model. In doing so, multiple candidate machine learning models or queries may be used to suggest a hardware platform. To do so, access to a knowledge-base of previous candidate machine learning models or deploying new candidate machine learning models may be used to find the best answer. Additionally or alternatively, the resource prediction twin 420 may allow the user 410 to select a suggested machine learning model as opposed to the suggested hardware platform if the user 410 inquiry is directed to knowing the best performing machine learning model to run on a specific hardware platform in terms of model performance metrics. Accordingly, the resource prediction twin 420 may tailor its results by providing the user 410 with options to select either a suggested hardware platform or a suggested machine learning model corresponding to the user 410 inquiry.

After the user 410 selects the suggested hardware platform, the deployable machine learning model may be deployed to execute the deployable machine learning model on the suggested hardware platform with the input data. Here, unlike the steps in FIG. 10 where virtual execution is performed, the deployable machine learning model may be physically executed on the suggested hardware platform. Here, the virtual execution may refer to a situation where the resource prediction twin 420 may simulate the performance of machine learning models on the hardware platforms without actually running the machine learning model.

Then, the performance of the deployable machine learning model may be provided as feedback to the system. Referring to FIG. 6, the actual performance metrics of the deployable machine learning may be stored in database 660, and provided to the cloud orchestrator 650. Then, the performance metrics of the deployable machine learning may be fed into the resource prediction twin 420, and the resource prediction twin 420 may be updated incrementally based on feedback.

In some forms of the present disclosure, the system may output a model implementation based on the suggested hardware platform or the suggested machine learning model. For example, the outputted model may be used for a zero-based budget. In another example, the outputted model may be used as an input to revise forecasts. Additionally or alternatively, the outputted model may be utilized to perform automatically, including but not limited to the resource prediction, resource allocation (e.g., spend, cost, change quantities of stock ordered, working hours of staff, staff positions, allocation of tasks, and the like). In particular, outputs from the execution of the suggested hardware platform or the suggested machine learning models may be used to allocate resources or tasks in order to achieve the targeted objective. For example, if the user 410 wants to know two best-performing hardware platforms to execute a particular machine learning model, after the resource prediction twin 420 renders the output, the system may automatically assign 70% of required tasks to hardware device 1 (e.g., memory capacity 8 GB, and a medium processing speed) and 30% of required tasks to hardware device 2 (e.g., memory capacity 4 GB, and an extremely high processing speed) depending on the performance of each respective hardware device in order to optimally accomplish the targeted objective.

Some of the technical advantages of the present disclosure may be as follows. First, the present disclosure may enable a user to infer various machine learning model metrics without the actual need to run the machine learning models on different hardware platforms and systems, therefore conserving significant computing resources. Second, the user may inquire about an arbitrary number of model performance metrics (e.g., model accuracy, precision, and the like) with no limits. Specifically, the present disclosure may take into consideration multiple objectives (e.g., accuracy, inference time, memory, latency, and the like) and output the best trade-off for specific tasks. In doing so, multiple candidate machine learning models or queries may be used to suggest hardware platforms. To do so, access to a knowledge-base of previous candidate machine learning models or deploying new candidate machine learning models may be used to find the best answer. Third, the user may have flexibility in inquiring about hardware-related metrics (e.g., memory used by model on the target hardware, power consumption by model, inference latency on target hardware) or model-related parameters. Fourth, the user may even inquire about the cost of running the model on different hardware devices or cloud systems or metrics of interest to the user for a particular model on different hardware or cloud systems. Fifth, the resource prediction twin may incrementally train itself whenever data are stored. Moreover, by intelligently deploying and measuring the performance of machine learning models on various hardware or cloud systems, a knowledge-based resource prediction twin may be automatically built. Furthermore, by using the MOBOGA, search space and number of samples to build the knowledge base for the resource prediction twin may be significantly reduced.

The methods, devices, processing, and logic described above may be implemented in many different ways and in many different combinations of hardware and software. For example, all or parts of the implementations may be circuitry that includes an instruction processor, such as a Central Processing Unit (CPU), microcontroller, or a microprocessor; an Application Specific Integrated Circuit (ASIC), Programmable Logic Device (PLD), or Field Programmable Gate Array (FPGA); or circuitry that includes discrete logic or other circuit components, including analog circuit components, digital circuit components or both; or any combination thereof. The circuitry may include discrete interconnected hardware components and/or may be combined on a single integrated circuit die, distributed among multiple integrated circuits dies, or implemented in a Multiple Chip Module (MCM) of multiple integrated circuits dies in a common package, as examples.

The circuitry may further include or access instructions for execution by the circuitry. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed as circuitry among multiple system components, such as among multiple processors and memories, optionally including multiple distributed processing systems. Parameters, databases, and other data structures may be separately stored and managed, may be incorporated into a single memory or database, may be logically and physically organized in many different ways, and may be implemented in many different ways, including as data structures such as linked lists, hash tables, arrays, records, objects, or implicit storage mechanisms. Programs may be parts (e.g., subroutines) of a single program, separate programs, distributed across several memories and processors, or implemented in many different ways, such as in a library, such as a shared library (e.g., a Dynamic Link Library (DLL)). The DLL, for example, may store instructions that perform any of the processing described above or illustrated in the drawings, when executed by the circuitry.

While the particular disclosure has been described with reference to illustrative embodiments, this description is not meant to be limiting. Various modifications of the illustrative embodiments and additional embodiments of the disclosure will be apparent to one of ordinary skill in the art from this description. Those skilled in the art will readily recognize that these and various other modifications can be made to the exemplary embodiments, illustrated and described herein, without departing from the spirit and scope of the present disclosure. It is therefore contemplated that the appended claims will cover any such modifications and alternate embodiments. Certain proportions within the illustrations may be exaggerated, while other proportions may be minimized. Accordingly, the disclosure and the figures are to be regarded as illustrative rather than restrictive.

What is claimed is:

1. A system comprising:
   non-transitory memory storing instructions executable to select a suggested hardware platform executing a machine learning model under constraints; and
   a processor configured to execute the instructions to:
   obtain input data including a targeted objective and the constraints;
   determine configurations of candidate machine learning models based on the input data;
   virtually execute, in a first virtualization process, the candidate machine learning models defined by a hyper-parameter set corresponding to the configurations based on the input data for a selection of machine learning model;
   obtain a virtual performance metrics set of each respective candidate machine learning model from virtual execution of the candidate machine learning models;
   generate an evaluation score of each respective candidate machine learning model based on a similarity of the virtual performance metrics set of each respective candidate machine learning model to the targeted objective;
   select a deployable machine learning model having the evaluation score that meets a predetermined criterion from among the candidate machine learning models;
   virtually execute, in a second virtualization process, the deployable machine learning model selected from the candidate machine learning models on each of candidate hardware platforms according to the constraints, the second virtualization process being performed by a hardware performance model to simulate the deployable machine learning model, the hardware performance model being trained based on probabilistic programming and comprising at least one generative model;
   generate an assessment report of the virtual performance metrics set of the deployable machine learning model executed on each of the candidate hardware platforms;
   select the suggested hardware platform meeting the predetermined criterion from among the candidate hardware platforms for running the selected machine learning model, the suggested hardware platform probabilistically satisfying the targeted objective under the constraints when combined with the deployable machine learning model for execution;
   output a model of an implementation of resource prediction based on the suggested hardware platform;
   automatically perform, using a resource prediction twin, the resource prediction and allocation of tasks associated with the resource prediction according to the outputted model, wherein the resource prediction twin includes a generative model that is trained, using probabilistic programming, on parameters of an inference model that is initialized with virtual parameters to generate real parameters as input to the outputted model; and
   based on the real parameter as input to the model, dynamically assigning a predetermined portion of required tasks to a first hardware device from the candidate hardware platforms and other portion of required tasks to a second hardware device depending on the performance of each respective hardware device in order to optimally accomplish the targeted objective.

2. The system of claim 1, wherein the processor is further configured to:
   in response to selecting the suggested hardware platform, generate and deploy the deployable machine learning model;
   execute the deployable machine learning model on the suggested hardware platform with the input data;
   provide a feedback associated with a performance of the deployable machine learning model to the system;
   store the feedback in the non-transitory memory; and
   update the deployable machine learning model based on the feedback.

3. The system of claim 1, wherein the processor is further configured to:
   output a resource prediction of a combination of the suggested hardware platform and the deployable machine learning model.

4. The system of claim 1, wherein the candidate hardware platforms comprise:
   a plurality of hardware devices or a plurality of cloud instances, each hardware device of the plurality of hardware devices further including representational state transfer (REST) application programming interface (API), simulator, and a hardware target.

5. The system of claim 1, wherein, when the virtual performance metrics set is obtained, the processor is configured to:
obtain the virtual performance metrics set of each respective candidate machine learning model from the non-transitory memory, the non-transitory memory pre-storing the virtual performance metrics set of a plurality of machine learning models.

6. The system of claim 1, wherein, when the configurations of the candidate machine learning models are determined, the processor is configured to:
determine whether the configurations of the candidate machine learning models correspond to the input data;
in response to determining that the configurations of the candidate machine learning models do not correspond to the input data, obtain a different hyper-parameter set; and
virtually execute the candidate machine learning models defined by the different hyper-parameter set.

7. A system comprising:
non-transitory memory storing instructions executable to select a suggested machine learning model executing on a hardware platform under constraints; and
a processor configured to execute the instructions to:
obtain input data including a targeted objective and the constraints;
determine configurations of candidate hardware platforms based on the input data;
virtually execute, in a first virtualization process, the candidate machine learning models defined by a hyper-parameter set corresponding to the configurations based on the input data for a selection of machine learning model;
obtain a virtual performance metrics set of each respective candidate machine learning model from virtual execution of the candidate machine learning models;
generate an evaluation score of each respective candidate machine learning model based on a similarity of the virtual performance metrics set of each respective candidate machine learning model to the targeted objective;
select a deployable machine learning model having the evaluation score that meets a predetermined criterion from among the candidate machine learning models;
virtually execute, in a second virtualization process, each of candidate machine learning models on the candidate hardware platforms according to the constraints, the second virtualization process being performed by a hardware performance model to simulate the deployable machine learning model, the hardware performance model being trained based on probabilistic programming and comprising at least one generative model;
generate an assessment report of the virtual performance metrics set of the deployable machine learning model executed on each of the candidate hardware platforms;
select the suggested machine learning model meeting a predetermined criterion from among the candidate machine learning models, the suggested machine learning model probabilistically satisfying the targeted objective under the constraints when combined with the candidate hardware platforms for execution;
output a model of an implementation of resource prediction based on the suggested machine learning model; and
automatically perform, using a resource prediction twin, the resource prediction and allocation of tasks associated with the resource prediction according to the outputted model, wherein the resource prediction twin includes a generative model that is trained, using probabilistic programming, on parameters of an inference model that is initialized with virtual parameters to generate real parameters as input to the outputted model; and
based on the real parameter as input to the outputted model, dynamically assigning a predetermined portion of required tasks to a first hardware device from the candidate hardware platforms and other portion of required tasks to a second hardware device depending on the performance of each respective hardware device in order to optimally accomplish the targeted objective.

8. The system of claim 7, wherein the processor is further configured to:
in response to selecting the suggested machine learning model, generate and deploy the suggested machine learning model;
execute the suggested machine learning model on the candidate hardware platforms with the input data;
provide a feedback associated with a performance of the suggested machine learning model to the system;
store the feedback in the non-transitory memory; and
update the suggested machine learning model based on the feedback.

9. A computer-implemented method performed by a processor configured to execute instructions to select a suggested hardware platform executing a machine learning model under constraints stored in non-transitory memory, the method comprising:
obtaining input data including a targeted objective and the constraints;
determining configurations of candidate machine learning models based on the input data;
virtually executing, in a first virtualization process, the candidate machine learning models defined by a hyper-parameter set corresponding to the configurations based on the input data for a selection of machine learning model;
obtaining a virtual performance metrics set of each respective candidate machine learning model from virtual execution of the candidate machine learning models;
generating an evaluation score of each respective candidate machine learning model based on a similarity of the virtual performance metrics set of each respective candidate machine learning model to the targeted objective;
selecting a deployable machine learning model having the evaluation score that meets a predetermined criterion from among the candidate machine learning models;
virtually execute, in a second virtualization process, the deployable machine learning model selected from the candidate machine learning models on each of candidate hardware platforms according to the constraints, the second virtualization process being performed by a hardware performance model to simulate the deployable machine learning model, the hardware performance model being trained based on probabilistic programming and comprising at least one generative model;

generating an assessment report of the virtual performance metrics set of the deployable machine learning model executed on each of the candidate hardware platforms;

selecting the suggested hardware platform meeting the predetermined criterion from among the candidate hardware platforms for running the selected machine learning model, the suggested hardware platform probabilistically satisfying the targeted objective under the constraints when combined with the deployable machine learning model for execution;

outputting a model of an implementation of resource prediction based on the suggested hardware platform;

automatically performing, using a resource prediction twin, the resource prediction and allocation of tasks associated with the resource prediction according to the outputted model, wherein the resource prediction twin includes a generative model that is trained, using probabilistic programming, on parameters of an inference model that is initialized with virtual parameters to generate real parameters as input to the outputted model; and based on the real parameter as input to the outputted model, dynamically assigning a predetermined portion of required tasks to a first hardware device from the candidate hardware platforms and other portion of required tasks to a second hardware device depending on the performance of each respective hardware device in order to optimally accomplish the targeted objective.

10. The method of claim 9 further comprising:
in response to selecting the suggested hardware platform, generating and deploying the deployable machine learning model;
executing the deployable machine learning model on the suggested hardware platform with the input data;
providing a feedback associated with a performance of the deployable machine learning model;
storing the feedback in the non-transitory memory; and
updating the deployable machine learning model based on the feedback.

11. The method of claim 9 further comprising:
outputting a resource prediction of a combination of the suggested hardware platform and the deployable machine learning model.

12. The method of claim 9, wherein the candidate hardware platforms comprise:
a plurality of hardware devices or a plurality of cloud instances, each hardware device of the plurality of hardware devices further including representational state transfer (REST) application programming interface (API), simulator, and a hardware target.

13. The method of claim 9, when obtaining the virtual performance metrics set comprises:
obtaining the virtual performance metrics set of each respective candidate machine learning model from the non-transitory memory, the non-transitory memory pre-storing the virtual performance metrics set of a plurality of machine learning models.

14. The method of claim 9, wherein determining the configurations of the candidate machine learning models comprises:
determining whether the configurations of the candidate machine learning models correspond to the input data;
in response to determining that the configurations of the candidate machine learning models do not correspond to the input data, obtaining a different hyper-parameter set; and virtually executing the candidate machine learning models defined by the different hyper-parameter set.

15. A computer-implemented method performed by a processor configured to execute instructions to select a suggested machine learning model executing on a hardware platform under constraints stored in non-transitory memory, the method comprising:
obtaining by the processor, input data including a targeted objective and the constraints;
determining by the processor, configurations of candidate hardware platforms based on the input data;
virtually executing, in a first virtualization process, the candidate machine learning models defined by a hyper-parameter set corresponding to the configurations based on the input data for a selection of machine learning model;
obtaining a virtual performance metrics set of each respective candidate machine learning model from virtual execution of the candidate machine learning models;
generating an evaluation score of each respective candidate machine learning model based on a similarity of the virtual performance metrics set of each respective candidate machine learning model to the targeted objective;
selecting a deployable machine learning model having the evaluation score that meets a predetermined criterion from among the candidate machine learning models;
virtually executing by the processor, in a second virtualization process, each of candidate machine learning models on the candidate hardware platforms according to the constraints, the second virtualization process being performed by a hardware performance model to simulate the deployable machine learning model, the hardware performance model being trained based on probabilistic programming and comprising at least one generative model;
generating an assessment report of the virtual performance metrics set of the deployable machine learning model executed on each of the candidate hardware platforms;
selecting by the processor, the suggested machine learning model meeting a predetermined criterion from among the candidate machine learning models, the suggested machine learning model probabilistically satisfying the targeted objective under the constraints when combined with the candidate hardware platforms for execution;
outputting, by the processor, a model of an implementation of resource prediction based on the candidate hardware platforms and the suggested machine learning model; and
automatically performing, using a resource prediction twin, the resource prediction and allocation of tasks associated with the resource prediction according to the outputted model, wherein the resource prediction twin includes a generative model that is trained, using probabilistic programming, on parameters of an inference model that is initialized with virtual parameters to generate real parameters as input to the outputted model, and
based on the real parameter as input to the outputted model, dynamically assigning a predetermined portion of required tasks to a first hardware device from the candidate hardware platforms and other portion of required tasks to a second hardware device depending on the performance of each respective hardware device in order to optimally accomplish the targeted objective.

16. The method of claim 15 further comprising:

in response to selecting the suggested machine learning model, generating and deploying the suggested machine learning model;

executing the suggested machine learning model on the candidate hardware platforms with the input data;

providing a feedback associated with a performance of the suggested machine learning model;

storing the feedback in the non-transitory memory; and updating the suggested machine learning model based on the feedback.

\* \* \* \* \*